United States Patent
Herrles et al.

(10) Patent No.: US 11,845,538 B2
(45) Date of Patent: Dec. 19, 2023

(54) PERFORMANCE EVALUATION SYSTEM OF AN AIRCRAFT COMPONENT

(71) Applicants: AIRBUS DEFENCE AND SPACE GMBH, Taufkirchen (DE); AIRBUS OPERATIONS GMBH, Hamburg (DE)

(72) Inventors: Christian Herrles, Taufkirchen (DE); Nikolai Striffler, Taufkirchen (DE); Norbert Karpen, Taufkirchen (DE); Elmar Bonaccurso, Taufkirchen (DE); Jürgen Wehr, Taufkirchen (DE); Susanne Holtemeyer, Hamburg (DE); Silke Grünke, Hamburg (DE); Nicole Jordan, Hamburg (DE); Franz Xaver Hallweger, Taufkirchen (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 182 days.

(21) Appl. No.: 17/427,536

(22) PCT Filed: Apr. 7, 2020

(86) PCT No.: PCT/EP2020/059937
§ 371 (c)(1),
(2) Date: Jul. 30, 2021

(87) PCT Pub. No.: WO2020/212208
PCT Pub. Date: Oct. 22, 2020

(65) Prior Publication Data
US 2022/0097829 A1 Mar. 31, 2022

(30) Foreign Application Priority Data
Apr. 18, 2019 (EP) .................................... 19170127

(51) Int. Cl.
*B64C 21/02* (2006.01)
*B64C 21/04* (2023.01)
(Continued)

(52) U.S. Cl.
CPC ............ *B64C 21/025* (2013.01); *B64C 21/04* (2013.01); *B64C 21/06* (2013.01); *B64C 21/08* (2013.01);
(Continued)

(58) Field of Classification Search
CPC ....... B64C 21/02; B64C 21/025; B64C 21/04; B64C 21/06; B64C 21/08; B64C 2230/04; B64C 2230/22
See application file for complete search history.

(56) References Cited

U.S. PATENT DOCUMENTS 5,899,416 A * 5/1999 Meister .................. B64C 21/06
244/87
6,216,982 B1 4/2001 Pfennig et al.
(Continued)

FOREIGN PATENT DOCUMENTS

| EP | 0 955 235 | 11/1999 |
|---|---|---|
| WO | 2010/083494 | 7/2010 |
| WO | 2011/069650 | 6/2011 |

OTHER PUBLICATIONS

Extended European Search Report for EP Application No. 19170127.5 dated Oct. 1, 2019, 8 pages.
(Continued)

*Primary Examiner* — Nicholas McFall
(74) *Attorney, Agent, or Firm* — Nixon & Vanderhye P.C.

(57) ABSTRACT

A system and a method for evaluating performance of a porous skin of an aircraft including the porous skin, and a boundary layer control system. The performance evaluation system includes a first sensor providing data related to the
(Continued)

performance of the porous skin. The performance evaluation system is further configured to clean the porous skin based on the performance of the porous skin determined using the data received from the first sensor in order to ensure that the porous skin operates at its maximum capability.

18 Claims, 2 Drawing Sheets

(51) Int. Cl.
  *B64C 21/06* (2023.01)
  *B64C 21/08* (2023.01)
(52) U.S. Cl.
  CPC ...... *B64C 2230/04* (2013.01); *B64C 2230/06* (2013.01); *B64C 2230/22* (2013.01)

(56) References Cited

U.S. PATENT DOCUMENTS

| | | |
|---|---|---|
| 9,272,773 B2 | 3/2016 | Biedscheid |
| 9,757,776 B2 | 9/2017 | Nikic |
| 2018/0043995 A1* | 2/2018 | Shmilovich ............. B64C 21/02 |

OTHER PUBLICATIONS

International Search Report and Written Opinion of the ISA for PCT/EP2020/059937 dated Jul. 10, 2020, 16 pages.

* cited by examiner

PERFORMANCE EVALUATION SYSTEM OF AN AIRCRAFT COMPONENT

RELATED APPLICATION

This application is the U.S. national phase of International Application PCT/EP2020/059937 filed Apr. 7, 2020, which designated the U.S. and claims priority to European Patent Application EP 19170127.5, filed Apr. 18, 201, the entire contents of each of which are hereby incorporated by reference.

TECHNICAL FIELD

Various embodiments relate generally to a performance evaluation system of an aircraft component.

BACKGROUND

Some aircraft utilizes micro-perforations on aerodynamic surfaces to manipulate the airflow around these surfaces. By manipulating the airflow around such aerodynamic surfaces, the overall drag generated by the aerodynamic surfaces is substantially reduced. Usually the air is sucked in through these micro-perforations to control the boundary layer. For example, patent EP0955235 teaches on a system for achieving a boundary layer control by sucking at least a portion of the boundary layer air flowing through perforated or porous suction areas on the outer skin of the wings or other areas of the aircraft. The suction of air can be achieved by several means like using jet pumps as defined in EP0955235 or using a trap door as described in EP2387529.

Despite having a system to manipulate the boundary layer, the issue is that deposition of contaminations such as dust or insects or formation of ice over these micro-perforations render such systems less effective and sometimes useless. There are methods available to monitor the presence of contamination in individual aperture, for example as described in U.S. Pat. No. 9,757,776, but such methods don't have the capability to determine if the presence of contamination is critical and need to be cleaned or the system can be operated effectively without necessarily being cleaned.

Hence, there may be a need to provide for an aircraft, a system and a method to overcome the above-mentioned disadvantages.

SUMMARY

The problem of the present invention is solved by the subject matters of the independent claims. Further advantageous embodiments of the invention are included in the dependent claims. It should be noted that the aspects of the invention described in the following apply both to a system and a method to evaluate performance of a porous skin.

According to the present invention, a performance evaluation system for a porous skin of an aircraft is provided. The aircraft comprises of the porous skin, and a boundary layer control system. The boundary layer control system is a system capable of modifying the behavior of the boundary layer of an airflow over at least a part of the aircraft. The boundary layer control system comprises at least the porous skin, an internal cavity, a diffuser, and a purging system. The porous skin includes at least a plurality of pores fluidly connecting the internal cavity to an external atmosphere. The porous skin defines at least a part of a skin of the aircraft. The skin of the aircraft is usually part of the surface of the aircraft exposed to the external atmosphere. Further the diffuser is fluidly connecting the purging system to the internal cavity. The purging system is a system capable of discharging fluid through the pores at least one of outwardly and inwardly. The purging system can be considered as a pump capable of discharging fluid. On positive displacement, the pump can discharge fluid through the pores outwardly, and when reversed, the pump can suck fluid inwardly through the pores.

The performance evaluation system comprising at least a first sensor producing at least a first data. Further, the first sensor is located in at least one of the internal cavity and the diffuser. The performance evaluation system further comprises at least a processing unit. The processing unit is configured to receive at least the first data from the first sensor to determine at least a value representative of a performance of the porous skin.

The first sensor is located in at least one of the internal cavity and the diffuser to measure the property of the fluid being discharged by the purging system through the pores. The performance of the porous skin can be determined based on one or many of the properties of the fluid being discharged by the purging system. The properties of the fluid can be one of many of its pressure, temperature, volume, velocity, and humidity. Depending upon the size of the pores being fully open or partially closed or completely closed, at least one of the property of the fluid will be affected. For example, when the purging system tries to discharge the fluid outwardly, the pressure of the fluid in the internal cavity and the diffuser tend to increase due to the pores being completely open or the pores being completely closed. Hence, by measuring, for example, the pressure of the fluid in the internal cavity and/or the diffuser, one can interpret and relate to the performance of the pores in controlling the boundary layer over the porous skin.

According to further embodiment, the processing unit can be configured to receive a second data from a second sensor to determine a value representative of the performance of the porous skin. The processing unit may use the first data along with the second data to determine the value representative of the performance of the porous skin.

It is difficult in certain situation to determine the exact performance of the porous skin only with the data on the property of the fluid within the internal cavity and/or the diffuser. Hence, in order to determine the performance of the porous skin, it might be necessary to know the property of the fluid of the external atmosphere. The second sensor can be used to measure the property of the fluid in the external atmosphere. The fluid in the external atmosphere is responsible for creating the boundary layer over the aircraft. The purpose of the boundary layer control system is to control this boundary layer over certain parts of the aircraft depending upon the design and location of the boundary layer control system.

According to further embodiment, the processing unit can be configured to receive a third data from a memory unit. The third data may comprise at least a value representative of at least a minimum acceptable performance of the porous skin.

The boundary layer control system is used to improve the performance of the aircraft. For example, by controlling the boundary layer it is possible to reduce the drag force produced by the aircraft during flight. During the design of the aircraft and the boundary layer control system for the aircraft, several numerical and experimental analysis might have been carried out to identify the benefit of the boundary layer control system towards the performance of the aircraft.

During these analysis, it is possible to identify a relationship between the performance of the aircraft at different flight conditions and various conditions of the porous skin. For example, the condition of the porous skin can vary from the pores of the porous skin being clean, and/or partly closed, and/or completely closed. It is to be understood that when the pores are clean, the boundary layer control system can control the intended boundary layer with maximum efficiency, and when the pores are completely closed, the boundary layer control system cannot control the intended boundary layer at all. One can identify the minimum acceptable performance of the porous skin during the design of the aircraft and the boundary layer control system, and such identified minimum acceptable performance of the porous skin can be stored in a memory unit which can be accessed by the processing unit. The memory unit can be independent of the processing unit or it can be integral part of the processing unit.

The minimum acceptable performance of the porous skin can be, for example, percentage of pores of the porous skin being blocked or one or many properties of the fluid in at least one of the internal cavity and the diffuser. The minimum acceptable performance of the porous skin can be different for different flight conditions of the aircraft. For example, it might be acceptable for all the pores to be blocked at low flight speeds of the aircraft, whereas it might expected to be at least half of the pores of the porous skin to be not blocked during cruise.

According to further embodiment, the performance evaluation system may comprise at least a cleaning device. The cleaning device can be configured to remove a contamination formed on at least a part of the porous skin upon activation.

In actual operation of the aircraft, the surrounding environment may not be clean or dry or of optimal temperature as the test environment. The pores of the porous structure are usually tiny of the order of 10 micrometers to maximum of 1 millimeter in diameter. Hence, during operation of the aircraft, especially during take-off and climb, it is possible that the dust in the lower atmosphere or the sand or the formation of ice to block one of many of the pores partially or completely. It can be considered that such dust or sand or insects or formation of ice as contamination. In order for the boundary layer control system to operate with maximum efficiency, the contamination may need to be removed. The cleaning device can be used for such purpose. Usually, in case of contamination like dust or sand, it is possible to use the purging system to blow out or suck in the contamination. But certain contamination, for example, formation of ice may not be cleaned using the purging system, and may require a different cleaning device. Hence the cleaning device can be based on the requirement and the environment the aircraft is mostly operated. The cleaning device can be one or many of, for example, a hot air generation system, a hot water blowing system, a laser based cleaning system, a dry-ice blaster, a piezoelectric actuator or the purging system, depending upon the environment of the operation of the aircraft and/or the design of the aircraft and/or as per the requirement of the customer.

The cleaning device can be placed in the internal cavity or embedded on the inner surface of the porous skin or externally on the aircraft depending upon the type of device used for the purpose of cleaning the porous skin such that it can be used for cleaning one or many type of contamination that can be formed over the porous skin.

According to further embodiment, the processing unit can be configured to activate the cleaning device when the value representative of the performance of the porous skin reaches at least a predetermined performance criteria in relation to the minimum acceptable performance of the porous skin. This action ensures that the boundary layer control system can be used at its maximum efficiency. It is possible that when the cleaning device is activated, the boundary layer control system is ineffective. Hence, one may not be able to use the cleaning device continuously throughout the flight and it necessary to activate the cleaning device only when it is necessary. One way to do so is to activate the cleaning device based on the performance of the porous skin and the minimum acceptable performance of the porous skin. The criteria to activate the cleaning device can be, for example, in terms of percentage of the minimum acceptable performance of the porous skin. For example, the difference between performance of the porous skin and the minimum acceptable performance can be set between 0% and 50% of the minimum acceptable performance of the porous skin to activate the cleaning device.

According to further embodiment, the processing unit can be configured to receive the first data from the first sensor continuously at every predetermined time interval. The processing unit can be further configured to determine the value representative of the performance of the porous skin at every predetermined time interval using at least the first data received at that time instance.

The contamination may be gradually formed over the porous skin, and it might be necessary to monitor the performance continuously by determining the performance of the porous skin continuously. In order to save the power consumed by the system, the performance can be monitored periodically at every predetermined time interval. For the purpose of the same, the processing unit might be required to gather the first data from the first sensor continuously or periodically at every predetermined time interval. The time interval can be fixed during the design by the manufacturer or can be set during the operation of the aircraft by the user. Further, the time interval can be different for different phases of the flight. For example, it might be necessary to obtain the first data more frequently during take-off and climb phase of the aircraft and can be less frequent during cruise and may chose not to gather the data during descent and approach phase.

According to further embodiment, the processing unit may also be configured to receive the second data from the second sensor continuously at every predetermined time interval. The processing unit can be further configured to determine the value representative of the performance of the porous skin using at least the first data and the second data received at that time instance.

The condition of the external environment may also change over time during operation of the aircraft, hence it might be necessary to gather the second data from the second sensor continuously along with the first data from the first sensor. For example, during the climb phase, the altitude of the aircraft changes quickly and in order to determine the performance of the porous skin more accurately, it might be necessary to use the second data from the second sensor along with the first data from the first sensor to determine the value representative of the performance of the porous skin.

According to further embodiment, the processing unit can be configured to calculate a duration of time remaining until the minimum acceptable performance of the porous skin might be reached based on the history of the performance of the porous skin determined by the processing unit at each time instance and the minimum acceptable performance of the porous skin received from the memory unit.

By continuously monitoring the performance of the porous skin, it might be possible to extrapolate the trend of degradation of the performance of the porous skin to determine the minimum duration of time remaining until the minimum acceptable performance of the porous skin might be reached. Such information might be useful for the pilot of the aircraft to understand the behavior of the aircraft and possibly help the pilot to plan any critical operations of the aircraft.

According to further embodiment, the performance evaluation system may comprise at least a display. The display can be configured receive at least a data from the processing unit. The display can be adapted to display the data received from the processing unit. The data can be at least one of the first data and the time until the minimum acceptable performance of the porous skin can be reached.

For the pilot or any crew of the aircraft to make an informed decision, it might be necessary to display relevant information. It might be useful for the crew to have a visualization of the first data from the first sensor and/or the time until the minimum acceptable performance of the porous skin might be reached. Additionally, the display can display the performance of the porous skin determined by the processing unit. The display can be a standalone display or it can be part of an existing display already used by the aircraft for a different purpose.

According to further embodiment, the performance evaluation system may comprise a manual switch. The manual switch can be moved to at least a first position and a second position. The switch may activate the cleaning device when moved to the first position and may deactivate the cleaning device when moved to the second position.

Under certain circumstances, it might be required for the crew to activate the cleaning device manually. For example, if the pilot decides to not to wait until the performance of the porous skin to reach the minimum acceptable performance of the porous skin, as the time estimated for the minimum acceptable performance of the porous skin is too long or some other critical operation might be needed to be done at the estimated time, then the pilot may manually activate and deactivate the cleaning device using the manual switch.

According to further embodiment, the processing unit can be configured to deactivate the cleaning device after a predetermine duration of time.

It might be possible that the sensors may not be able to measure accurately the performance of the porous skin when the cleaning device is active. Hence, it might be necessary to deactivate the cleaning device automatically after certain time. The time can be a function of performance of the porous skin and the minimum acceptable performance of the porous skin. For example, at the early stages of degradation of performance of the porous skin, the duration of time until deactivation of the cleaning device can be shorter than the time duration when the performance of the porous skin is closer or equal to the minimum acceptable performance of the porous skin.

According to further embodiment, the first sensor can be at least one of a pressure sensor, an optical sensor, a humidity sensor, a temperature sensor, and a mass flow meter. An optical sensor can be understood as a sensor which can detect and measure the blockage of the porous skin using one or many of the techniques using light or laser.

According to further embodiment, the second sensor can be a sensor of the aircraft used for monitoring at least a behavior of the aircraft. For the operation of the aircraft, several sensors are used, for example, to measure the velocity of the ambient air, altitude in which the aircraft is flying, attitude of the aircraft. Such data collected for the operation of the aircraft can be used to determine the performance of the porous skin along with the first data received from the first sensor.

According to the present invention, also a method for evaluating a performance of a porous skin of an aircraft is presented.

The method comprises a step of receiving at least a first data from the first sensor. The first sensor is located in at least one of an internal cavity and a diffuser of a boundary layer control system of the aircraft. The boundary layer control system of the aircraft further comprises a porous skin and a purging system. The porous skin of the aircraft includes a plurality of pores fluidly connecting the internal cavity to the external atmosphere. The porous skin defines at least a part of the skin of the aircraft. The diffuser of the boundary layer control system fluidly connects the purging system to the internal cavity of the boundary layer control system. The purging system of the boundary layer control system is capable of discharging fluid through the pores at least one of outwardly and inwardly.

The method further comprises a step of determining at least a value representative of a performance of the porous skin using at least the first data from the first sensor. The method further comprises a step of activating a cleaning device when the value representative of the performance of the porous skin reaches a predetermined performance criteria in relation to a minimum acceptable performance of the porous skin. The cleaning device is configured to remove a contamination formed on at least a part of the porous skin upon activation.

The methods further comprise performing the steps of receiving the first data, determining at least the value representative of the performance of the porous skin, and activating the cleaning device based on the predetermined performance criteria, continuously at every predetermined time interval.

The method finally comprises a step of deactivating the cleaning device after a predetermined duration of time.

According to further embodiment, the methods for evaluating the performance of the porous skin of the aircraft further comprises a step of calculating a duration of time remaining until the minimum acceptable performance of the porous skin is reached based on the history of the performance of the porous skin determined at every predetermined time interval. The methods further includes the step of displaying at least one of the time remaining until the minimum acceptable performance of the porous skin is reached and the first data on to a display.

Finally, the above-mentioned steps are repeated throughout the operation of the aircraft, ensuring that the porous skin is operated throughout the flight at its maximum possible efficiency. The above-mentioned steps can be configured to also operate while the aircraft is on ground and while during different phases of aircraft while on ground such as, for example, taxiing, take-off, and landing.

However, the skilled person will understand that these steps can be carried out in any other suitable order. Alternatively, one or more of the steps may be carried out concurrently.

These and other aspects of the present invention will become apparent from and be elucidated with reference to the embodiments described hereinafter.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the drawings, the left-most digit(s) of a reference number can identify the drawing in which the reference number first appears. The same numbers can be used throughout the drawings to reference like features and components. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
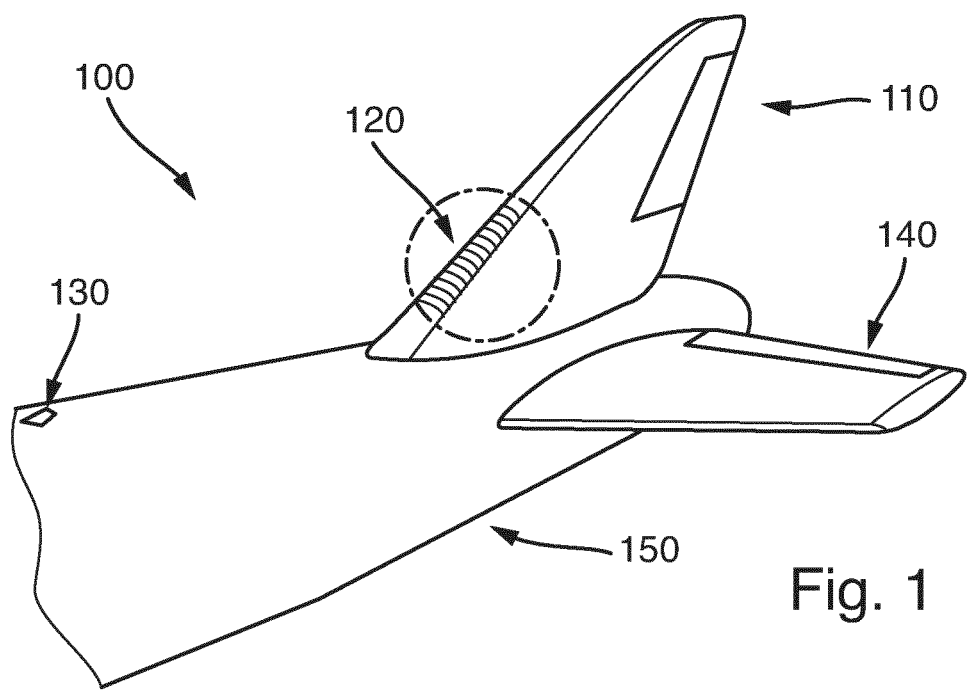
FIG. 1 shows schematically a rear fuselage of an aircraft.

FIG. 1 shows schematically an exemplary rear fuselage 100 of an aircraft. The rear fuselage 100 can be defined as parts or components of the aircraft usually found after a wing of the aircraft. The rear fuselage 100 of the aircraft typically comprises a vertical tail plane or simply called as VTP 110, a horizontal tail plane or simply called as HTP 140. The VTP 110 and the HTP 140 are attached to the near end 150 of the rear fuselage 100, which is usually conical towards the end. In this illustration, a part of a structure of the VTP 110 is made of porous skin 120. In this illustrated example, the lower part of the leading edge of the VTP 110 is made up of porous skin 120.

FIG. 1 also schematically shows a sensor 130, placed at the near beginning of the rear fuselage 100. The sensor 130 illustrated in this example is an optical sensor. The optical sensor is a laser measurement system in the illustrated example. The sensor 130 in this illustrated example, has a direct view on the porous skin 120. This laser based optical sensor 130 can sense the blockage of any pores of the porous skin 120 based on, for example, the intensity of the laser beam on the porous skin 120.

Figure 2:
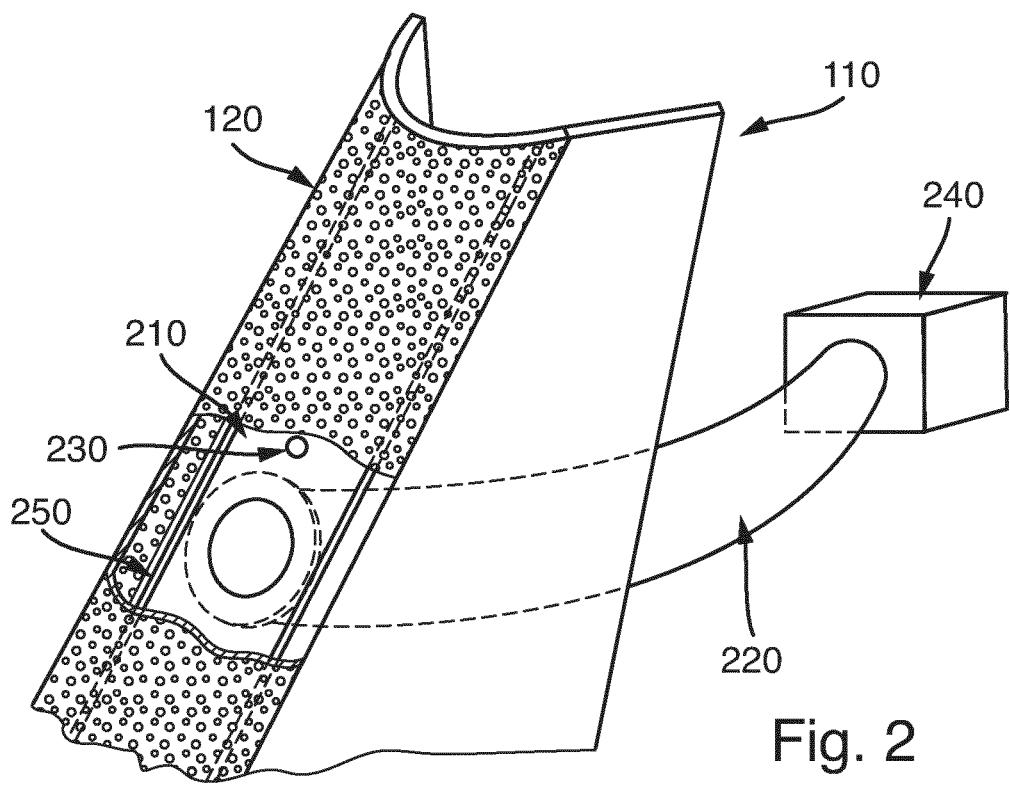
FIG. 2 shows schematically part of a VTP.

FIG. 2 shows schematically an exemplary part of a VTP 110. The part of the VTP 100 shown schematically in FIG. 2 is the part of the VTP 100 circled in FIG. 1. The part of the VTP 110 in this illustrated example comprises porous skin 120, forming the leading edge of the VTP 110. A section of the porous skin 120 is cut in this illustrated example to show the components within the part of the internal cavity 210. The internal cavity 210 comprises of the hollow region within the porous skin 120 and a non-porous internal wall. The internal wall can be, as illustrated in this example, a front spar of the component. In this example, the component is the VTP 110. The internal cavity 210 further fluidly connected to a duct 220, where one end is connected to the internal cavity 210 and the other end to a purging system 240 capable of at least one of blowing and sucking fluids. In this illustrated example, the fluid is air and the purging system 240 is a pneumatic pump. The airflow around the porous skin 120 is affected when the purging system 240 blows or sucks air. Such action is performed usually when the aircraft is in flight. The porous skin 120, internal cavity 210, the duct 220, and the purging system 240 comprises to form the boundary layer control system.

The illustrated example also shows a sensor 230 placed within the internal cavity 210 which is an example of a diffuser, to measure the property of the air within the internal cavity. In this example, the sensor 230 is a pressure sensor, configured to measure at least one of a dynamic pressure and a static pressure of the air in the internal cavity 210. Alternatively, the sensor 230 can also be placed within the duct 220. It is preferred to use more than one sensor and placed within both internal cavity 210 and duct 220 to increase the accuracy of the property of the fluid measured. Further, more than one type of sensor, for example pressure sensor, humidity sensor, temperature sensor, mass flow meter, etc. can be placed at various locations within the internal cavity 210 and the duct 220 to measure and/or monitor the property of the fluid. Alternatively, the sensor can be an optical sensor which can monitor the blockage of the pores of the porous skin 120, instead of interpreting the property of the fluid within the internal cavity 210 and/or the duct 220 as the performance of the porous skin 120. In such case, the optical sensor can be placed within the internal cavity 210 or externally on the aircraft as illustrated in FIG. 1.

The illustrated example also shows a cleaning system 250 arranged within the hollow section of the internal cavity 210 and arranged along the length of the porous skin 120. In this illustrated example, the cleaning system 250 is a hot water blowing system. The cleaning system 250, in this example, can blow hot water on the porous skin 120 upon activation, hence removing any contamination that might be deposited on the porous skin 120. In this example, the contamination is considered to be formation of ice on the porous skin 120. By removing any ice formed on the porous skin 120 enables it to perform at its maximum capability. The cleaning system 250 can be also designed to be of multiple independent sections and certain section of the cleaning system 250 can be activated to clean only corresponding section of the porous skin 120. By doing so, the power and hot water required to clean the porous skin 120 can be reduced.

Figure 3:
FIG. 3 shows schematically an insect on a porous skin.

FIG. 3 shows schematically an exemplary insect 310 on a porous skin 120. In this illustrated example, the insect 310 can be considered as the contamination on the porous skin 120 resulting in degraded performance of the porous skin 120.

Figure 4:
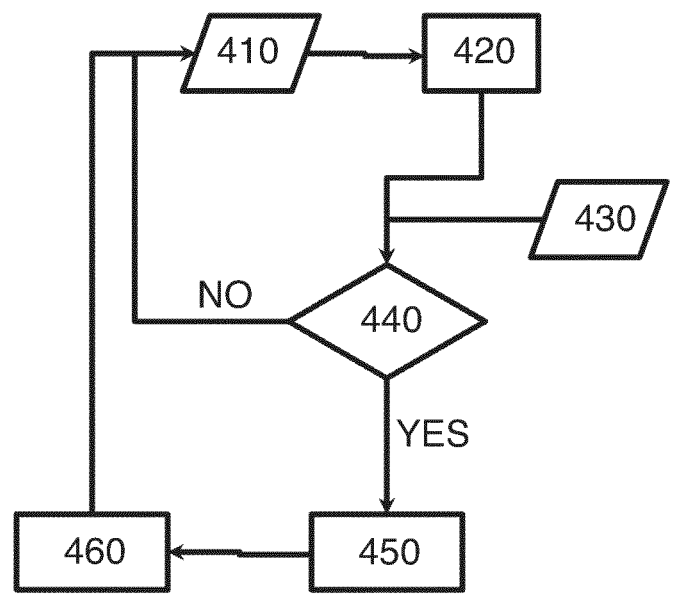
FIG. 4 shows schematically the operational algorithm of a processing unit.

FIG. 4 shows schematically an exemplary operational algorithm of a processing unit. The algorithm involves the step 410 of receiving first data from a first sensor. The first sensor provides information necessary to determine a performance of the porous skin of an aircraft. The first sensor can be at least one or many of pressure sensor, humidity sensor, temperature sensor, mass flow meter, or an optical sensor capable of measuring blockage of the porous skin. The first sensor might be located within the internal cavity or a diffuser of a boundary layer control system of the aircraft. Alternatively, in case of an optical sensor used to detect the blockage of the porous skin, the sensor can be located externally on the aircraft directed towards the porous skin.

The algorithm further involves the step 420 of determining at least a value representative of the performance of the porous skin using the first data received from the first sensor. In step 440, the processing unit receives the value representative of the performance of the porous skin determined in step 420 and a minimum acceptable performance of the porous skin 430 already stored in one of the memory unit of the aircraft. In step 440, the processing unit further compares the data received based on a predetermined performance criteria and checks if the predetermined performance criteria is satisfied. For example, the predetermined criteria can be the performance of the porous skin reaches a percentage of the minimum acceptable performance of the porous skin. The percentage can be zero, for example, meaning the performance of the porous skin is equal to the minimum acceptable performance of the porous skin. The minimum acceptable performance 430 stored in one of the memory unit of the aircraft can be series of data corresponding to the various possible operating condition of the aircraft. Depending upon the current operating condition of the aircraft, an appropriate minimum acceptable performance of the porous skin can be calculated by choosing the closest value or interpolating the data or extrapolating the data.

If the predetermined performance criteria is satisfied, the processing unit execute the step 450 of activating a cleaning device. The cleaning device is configured to remove at least a contamination formed over the porous skin resulting in blockage of the pores of the porous skin, hence resulting in degradation of the performance of the porous skin. The algorithm further includes a step 460 where the processing unit deactivated the cleaning device after a predetermined duration of time.

The process is repeated if the predetermined performance criteria is not met in step 440 and if the cleaning device is deactivated in step 460.

What is claimed is:

1. An aircraft comprising:
an aerodynamic structure including a porous skin,
a boundary layer control system, and
a performance evaluation system;
wherein the boundary layer control system includes at least the porous skin, an internal cavity within the aerodynamic structure, a diffuser, and a purging system;
wherein the porous skin includes at least a plurality of pores fluidly connecting the internal cavity to an external atmosphere adjacent the porous skin,
wherein the diffuser fluidly connects the purging system to the internal cavity;
wherein the purging system is configured to discharge fluid through the pores at least one of outwardly of the porous skin and inwardly of the porous skin; and
wherein the performance evaluation system comprises;
at least a first sensor producing at least a first data, wherein the first sensor is located in at least one of the internal cavity and the diffuser;
at least a processing unit which:
receives at least the first data from the first sensor,
determines, using the first data and repeatedly over time, values representative of a performance of the porous skin;
calculates a period remaining until a minimum acceptable performance of the porous skin is reached based on a history of the values representative of the performance of the porous skin, and
causes a display to display the period remaining until the minimum acceptable performance of the porous skin is reached.

2. The aircraft of claim 1, wherein the processing unit is configured to receive a second data from a second sensor to determine at least the value representative of the performance of the porous skin using at least the first data and the second data.

3. The aircraft of claim 2, wherein the processing unit is configured to receive the second data from the second sensor at predetermined time intervals; and
wherein the processing unit is further configured to determine the value representative of the performance of the porous skin using at least the first data and the second data received at the time instance.

4. The aircraft of claim 2, wherein the second sensor is a sensor of the aircraft configured to monitor at least a behavior of the aircraft.

5. The aircraft of claim 1, wherein the processing unit is configured to receive a third data from a memory unit; and
wherein the third data comprises at least a value representative of at least a minimum acceptable performance of the porous skin.

6. The aircraft of claim 5, wherein the processing unit is configured to calculate a duration of time remaining until the minimum acceptable performance of the porous skin is reached based on the history of the performance of the porous skin determined by the processing unit and the minimum acceptable performance of the porous skin received from the memory unit.

7. The aircraft of claim 1, further comprising a cleaning device configured to remove a contamination formed on at least a part of the porous skin in response to activation of the cleaning device, wherein the cleaning device is within the internal cavity and is configured to spray a liquid on an inner surface of the porous skin.

8. The aircraft of claim 7, wherein the processing unit is configured to activate the cleaning device when the value representative of the performance of the porous skin reaches a predetermined performance criteria in relation to the minimum acceptable performance of the porous skin.

9. The aircraft of claim 8, wherein the processing unit is configured to deactivate the cleaning device after a predetermined duration of time.

10. The aircraft of claim 7, further comprising: a manual switch configured to move to a first position and a second position;
wherein the switch activates the cleaning device when moved to the first position; and
wherein the switch deactivates the cleaning device when moved to the second position.

11. The aircraft of claim 1, wherein processing unit is configured to receive the first data from the first sensor at predetermined time intervals; and
wherein the processing unit is further configured to determine the value representative of the performance of the porous skin after each of the predetermined time intervals using at least the first data received at the time instance.

12. The aircraft of claim 1, further comprising: a display configured to receive a data from the processing unit;
wherein the display is configured to display information representing the data received from the processing unit; and
wherein the data is at least one of the first data and the time until the minimum acceptable performance of the porous skin is reached.

13. The aircraft of claim 1, wherein the first sensor comprises at least one of a pressure sensor, a humidity sensor, a temperature sensor, and a mass flow meter.

14. A method for evaluating a performance of a porous skin of an aircraft, wherein the method comprises:
receiving at least a first data from the first sensor, wherein the first sensor is located in at least one of an internal cavity and a diffuser of a boundary layer control system of the aircraft, and wherein the boundary layer control system further comprises a purging system;

the porous skin includes at least a plurality of pores fluidly connecting the internal cavity to an external atmosphere, wherein the porous skin defines at least a part of a skin of the aircraft;

the diffuser fluidly connects the purging system to the internal cavity, wherein the purging system is configured to discharge fluid through the pores at least one of outwardly of the porous skin and inwardly of the porous skin;

determining at least a value representative of a performance of the porous skin using at least the first data from the first sensor;

activating a cleaning device within the internal cavity when the value representative of the performance of the porous skin reaches a predetermined performance criteria in relation to a minimum acceptable performance of the porous skin, wherein the cleaning device when activated sprays a liquid on the porous skin to remove a contamination on at least a part of the porous skin on activation;

repeating the steps of receiving at least the first data, determining at least the value representative of the performance of the porous skin, and activating the cleaning device based on the predetermined performance criteria, at predetermined time intervals; and deactivating the cleaning device after a predetermined duration of time.

15. The method of claim 14, wherein the liquid includes water.

16. The method of claim 14, wherein the liquid is water.

17. The method of claim 14, wherein the liquid is hot water.

18. A method for evaluating a performance of a porous skin of an aircraft, wherein the method comprises:

receiving at least a first data from the first sensor, wherein the first sensor is located in at least one of an internal cavity and a diffuser of a boundary layer control system of the aircraft, and wherein the boundary layer control system further comprises a purging system;

the porous skin includes at least a plurality of pores fluidly connecting the internal cavity to an external atmosphere, wherein the porous skin defines at least a part of a skin of the aircraft;

the diffuser fluidly connects the purging system to the internal cavity, wherein the purging system is configured to discharge fluid through the pores at least one of outwardly of the porous skin and inwardly of the porous skin;

determining at least a value representative of a performance of the porous skin using at least the first data from the first sensor;

activating a cleaning device when the value representative of the performance of the porous skin reaches a predetermined performance criteria in relation to a minimum acceptable performance of the porous skin, wherein the cleaning device when activated removes a contamination on at least a part of the porous skin on activation;

repeating the steps of receiving at least the first data, determining at least the value representative of the performance of the porous skin, and activating the cleaning device based on the predetermined performance criteria, at predetermined time intervals;

deactivating the cleaning device after a predetermined duration of time;

calculating a duration of time remaining until the minimum acceptable performance of the porous skin is reached based on a history of the performance of the porous skin determined at every predetermined time interval; and displaying at least one of the time remaining until the minimum acceptable performance of the porous skin is reached and the first data on to a display.

* * * * *